US011523331B2

(12) United States Patent
Subramaniyan et al.

(10) Patent No.: US 11,523,331 B2
(45) Date of Patent: Dec. 6, 2022

(54) SYSTEMS AND METHODS FOR GENERATING VISUAL CUES FOR SPATIAL COMMUNICATION COVERAGE

(71) Applicant: Honeywell International Inc., Charlotte, NC (US)

(72) Inventors: Muthusankar Subramaniyan, Bangalore (IN); Gobinathan Baladhandapani, Madurai (IN); Hariharan Saptharishi, Madurai (IN); Sivakumar Kanagarajan, Bangalore (IN); Karthikeyan Mariappan, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 45 days.

(21) Appl. No.: 17/121,492

(22) Filed: Dec. 14, 2020

(65) Prior Publication Data

US 2022/0132402 A1 Apr. 28, 2022

(30) Foreign Application Priority Data

Oct. 23, 2020 (IN) .............................. 202041046390

(51) Int. Cl.
  *H04W 4/00* (2018.01)
  *H04W 48/16* (2009.01)
  (Continued)

(52) U.S. Cl.
  CPC ............ *H04W 48/16* (2013.01); *G08G 5/006* (2013.01); *H04B 7/18502* (2013.01)

(58) Field of Classification Search
  CPC .... H04W 48/16; G08G 5/006; H04B 7/18502
  (Continued)

(56) References Cited

U.S. PATENT DOCUMENTS 6,127,946 A   10/2000   Tzidon et al.
8,676,191 B2   3/2014   Soumier et al.
(Continued)

OTHER PUBLICATIONS

Roy S Barman et al: "Optimisations in aeronautical communications using aircrafts as relays", 2017 integrated communications, navigation and surveillance conference (ICNS), IEEE, Apr. 18, 2017 (Apr. 18, 2017), XP033143175, DOI: 10.1109/ICNSURV.2017.8011934 [retrieved on Aug. 16, 2017].

*Primary Examiner* — Tanmay K Shah
(74) *Attorney, Agent, or Firm* — Bookoff McAndrews, PLLC

(57) ABSTRACT

Disclosed are methods, systems, and non-transitory computer-readable media for generating visual cues for spatial communication coverage. For instance, the method may include obtaining a proposed travel path for a vehicle; locating one or more communication channels accessible to an operator of the vehicle in an area that includes at least a portion of the proposed travel path; and analyzing one or more characteristics of the one or more communication channels to determine one or more positions within the area at which the one or more communication channels will be inaccessible to the operator. The method may further include calculating a present position and a velocity of the vehicle; determining communication channel availability; and presenting the communication channel availability to the operator via a graphical user interface.

17 Claims, 9 Drawing Sheets

(51) Int. Cl.
*G08G 5/00* (2006.01)
*H04B 7/185* (2006.01)

(58) Field of Classification Search
USPC .......................................... 455/434
See application file for complete search history.

(56) References Cited

U.S. PATENT DOCUMENTS

| | | |
|---|---|---|
| 2001/0047229 A1 | 11/2001 | Staggs |
| 2002/0009993 A1 | 1/2002 | Dastrup et al. |
| 2009/0143078 A1* | 6/2009 | Tu .......................... H04W 8/18 |
| | | 455/456.3 |
| 2018/0091643 A1* | 3/2018 | Singh .................. G06F 3/04842 |

* cited by examiner

SYSTEMS AND METHODS FOR GENERATING VISUAL CUES FOR SPATIAL COMMUNICATION COVERAGE

CROSS-REFERENCE TO RELATED APPLICATIONS

This application claims the benefit of priority under 35 U.S.C. § 119 from Indian Patent Application No. 202041046390, filed on Oct. 23, 2020, the contents of which are incorporated by reference in their entirety.

TECHNICAL FIELD

Various embodiments of the present disclosure relate generally to the field of navigation for urban air mobility vehicles and, more particularly, to systems and methods for generating visual cues for spatial communication coverage.

BACKGROUND

Urban air mobility (UAM) vehicles are often used to navigate at low altitudes in regions with features such as tall buildings/structures, mountains, and other geological features that may interfere with line-of-sight communications. Vehicles navigating this type of airspace have a need for robust communication systems to maintain connection to ground stations and other vehicles in order to abide by air traffic control instructions and avoid collisions. It can be distracting and/or challenging for vehicle operators to manually scan various communication channels during an unexpected communication outage to determine if any are other available communication channels.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for generating visual cues for spatial communication coverage.

For instance, a method for generating visual cues for spatial communication coverage may include obtaining a proposed travel path for a vehicle; locating one or more accessible communication channels providing contact to a ground station in an area that includes at least a portion of the proposed travel path; and analyzing one or more characteristics of the one or more communication channels to determine one or more positions within the area at which the one or more communication channels will be inaccessible. The method may further include calculating a present position and a velocity of the vehicle; determining communication channel availability for the one or more communication channels; and presenting the communication channel availability to the operator via a graphical user interface, based on the present position of the vehicle.

Moreover, a spatial communication system of a vehicle may include a memory storing instructions and a processor executing the instructions to perform a process for generating visual cues for spatial communication coverage including: obtaining a proposed travel path for a vehicle; locating one or more communication channels capable of providing contact to a ground station and accessible to an operator of the vehicle in an area that includes at least a portion of the proposed travel path; and analyzing one or more characteristics of the one or more communication channels to determine one or more positions within the area at which the one or more communication channels will be inaccessible to the operator. The process performed by the processor may also include: calculating a present position and a velocity of the vehicle; determining communication channel availability for the one or more communication channels; and presenting the communication channel availability to the operator via a graphical user interface, based on the present position of the vehicle.

Moreover, a spatial communication system of a vehicle may include a memory storing instructions, a radio transmitter and receiver, a system display, and a processor executing the instructions to perform a process for generating visual cues for spatial communication coverage including: obtaining a proposed travel path for a vehicle; locating one or more communication channels capable of providing contact to a ground station and accessible to an operator of the vehicle in an area that includes at least a portion of the proposed travel path; and analyzing one or more characteristics of the one or more communication channels to determine one or more positions within the area at which the one or more communication channels will be inaccessible to the operator. The process performed by the processor may also include: calculating a present position and a velocity of the vehicle; determining communication channel availability for the one or more communication channels; and presenting the communication channel availability to the operator via a graphical user interface, based on the present position of the vehicle.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for urban air mobility vehicles and, more particularly, to systems and methods for generating visual cues for spatial communication coverage.

The present disclosure is directed to overcoming one or more of the challenges discussed above. As UAM vehicles generally operate at lower altitudes than other traditional aircraft, the radio and/or optical communication channels of UAM vehicles may be impaired by canyon effects, poor visibility or intentional malicious jamming of GNSS signals, obstructions formed by tall natural obstacles (e.g., hills, mountains, etc.) or erected structures on the ground (e.g., buildings, etc.), and/or poor visibility due to weather conditions (e.g., smog, fog, rain, etc.). Accordingly, vehicles may be navigating airspaces with one or more communication channels inaccessible due to line-of-sight obstacles and/or limited range of ground transceivers. When communications channels become inaccessible, vehicle operators may have to try to find other available channels, for example, other radio bands or other vehicles capable of relaying communications around obstacles or positions out of range of ground transceivers.

In general, the present disclosure is directed to systems and methods that are able to address one or more of the above challenges by generating visual cues that allow an operator to more easily see communication coverage along the flight path. For instance, a system may provide the operator of a vehicle with a visual representation of each of the communication channels accessible along the planned route, and may further determine relay communication channels that leverage other vehicles in the airspace that may have different communication channel availability. The systems and/or methods of the present disclosure for generating visual cues for spatial communication coverage may have an advantage of reducing the burden on the vehicle operator, thereby allowing the operator to place more attention on other critical aspects of the vehicle flight.

Therefore, by providing visual cues and identifying relay communication paths via nearby vehicles, vehicles may be able to maintain safe air navigation even when obstacles or range issues render one or more communication channels inaccessible.

While this disclosure describes the systems and methods with reference to aircraft, it should be appreciated that the present systems and methods are applicable to various other vehicles, including those of drones, automobiles, ships, spacecraft, or any other manned, unmanned, autonomous, and/or internet-connected vehicles.

Figure 1:
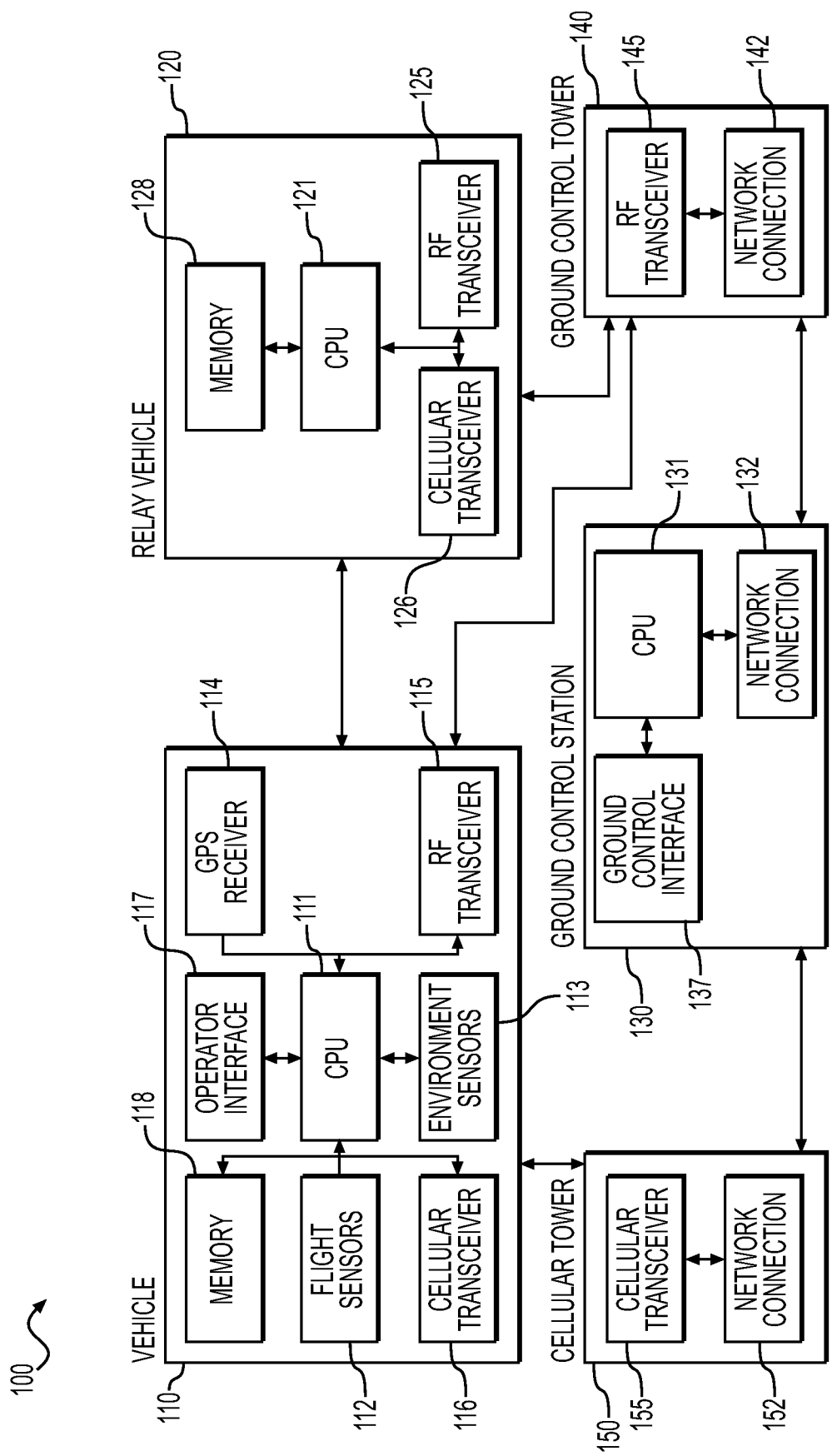
FIG. 1 depicts an example environment in which methods, systems, and other aspects of the present disclosure may be implemented.

FIG. 1 depicts an example environment in which systems, methods, and other aspects of the present disclosure may be implemented. The environment of FIG. 1 may include an airspace 100, vehicle 110, and one or more relay vehicles 120. Vehicle 110 may include CPU 111 in communication with a plurality of other flight components such as flight sensors 112, environment sensors 113, and GPS receiver 114. Flight sensors 112 may include a number of sensors for monitoring characteristics of the vehicle and its flight such as: altimeters, airspeed indicators, vertical speed indicators, compasses, artificial horizons, attitude indicators, and fuel/battery level sensors. Flight sensors 112 may provide the vehicle operator with information regarding the position, orientation, and status of vehicle 110 that may help the operator navigate airspace 100. Similarly, environment sensors 113 may provide the vehicle operator with information regarding aspects of airspace 100, and may include a number of sensors for monitoring the airspace environment such as: air temperature sensors, humidity sensors, proximity sensors, radar, and lidar. GPS receiver 114 may provide accurate location and/or speed data, and can also be incorporated with other systems, for example, traffic collision avoidance systems, weather avoidance systems, and terrain avoidance systems.

Vehicle 110 may need to be able to communicate with ground stations and other vehicles, and may do so using radio frequency (RF) transmitter/receiver (transceiver) 115 and/or cellular transceiver 116, for example. In some embodiments in accordance with the present disclosure, other suitable communications systems or devices may also be employed. The vehicle operator may provide control inputs and receive flight information and communications from ground stations and other vehicles via operator interface 117. Operator interface 117 may include devices such as monitors, touchscreen panels, keyboards, keypads, joysticks, trackpads, or other suitable devices for displaying information to, or for receiving inputs from, operators of vehicle 110. CPU 111 may have a need to store data (such as that received from flight sensors 112, environment sensors 113, GPS receiver 114, ground stations, or other vehicles) and instructions (such as operator inputs from operator interface 117 and vehicle programming) in memory 118. Memory 118 may be of any suitable type, such as steady state or conventional hard drives, flash storage, and/or cloud storage.

Other vehicles 120 in airspace 100 may be able to serve as communication repeaters for relaying messages in situations when direct communication is not practical or desired. Relay vehicle(s) 120 may be of a similar type to vehicle 110, or may be another suitable type of vehicle, including but not limited to: an airplane, a UAM, a vertical take-off and landing aircraft (VTOL), a drone, a helicopter, an unmanned aerial vehicle (UAV), a hot-air balloon, or a military aircraft. Relay vehicle 120 may include similar components as vehicle 110, for example a CPU 121, an RF transceiver 125, a cellular transceiver 126, and a memory 128.

Vehicles 110, 120 may need to communicate with one or more ground control stations 130 in order to, for example, receive flight guidance, avoid collisions, receive clearance for landing or takeoff, and/or modify routing. As shown in FIG. 1, ground control station 130 may include a CPU 131 provided with a network connection 132. Network connection 132 may connect ground control station 130 with, for example, ground control tower 140 or cellular tower 150. Ground control tower 140 may be comprised of RF transceiver 145 and network connection 142 in order to allow vehicles 110, 120 to use RF transceivers 115, 125 to communicate with ground control station 130. Similarly, cellular tower 150 may be comprised of RF transceiver 155 and network connection 152 in order to allow vehicles 110, 120 to use cellular transceivers 116, 126 to communicate with ground control station 130.

Ground control station 130 may also include a ground control interface 137, in connection with CPU 131, in order to allow ground control personnel to receive the communications from vehicles 110, 120 and to provide control inputs and feedback to guide and advise vehicles 110, 120 as they travel through airspace 100. Ground control interface 137 may include elements such as monitors/displays, keyboards, microphones, cameras, and other devices that can enable information to be provided to or inputted by the ground control personnel.

Airspace 100 may include a number of relay vehicles 120, ground control stations 130, ground control towers 140, and cellular towers 150. This often complicated collection of elements may provide vehicle 110 with a number of different communication channels. Because of the dynamic nature of vehicle 110 and the other elements in airspace 100, the availability of these communication channels may be constantly changing. As a result, the operator may have a need to know the current and future availability of those communication channels.

Figure 2:
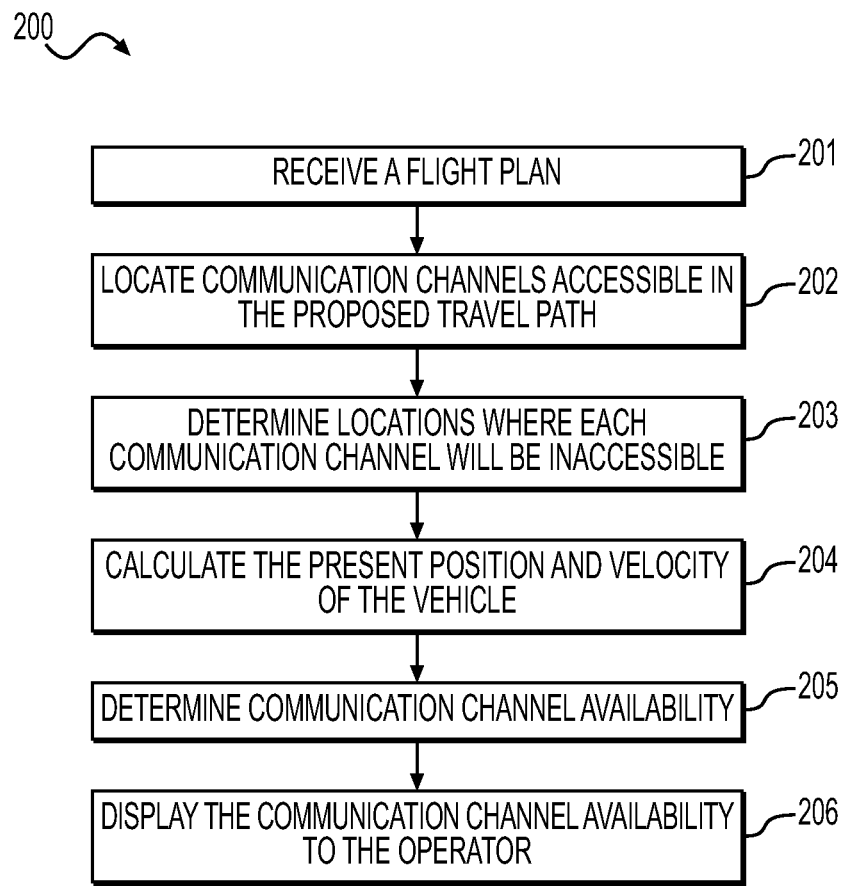
FIG. 2 depicts an exemplary flowchart for a process for generating visual cues for spatial communication coverage, according to one or more embodiments.

FIG. 2 illustrates an exemplary method 200 for determining and displaying communication channel availability to an operator of a vehicle in accordance with embodiments of the present disclosure. It should be understood that the steps described herein, and the sequence in which they are presented, are merely illustrative such that additional and/or fewer steps may be included without departing from the scope of the present disclosure.

Beginning at step 201, CPU 111 may be configured to receive a flight plan. This can be accomplished by, for example, receiving a flight plan and proposed travel path from ground control station 130, inputting a destination via operator interface 117 and having CPU 111 calculate a flight plan and proposed travel path, or any other suitable method of determining and obtaining the proposed travel path for vehicle 110.

Having mapped out the proposed travel path for vehicle 110, at step 202, the system may then locate the communication channels that may be accessible to an operator of the vehicle along that path. This can include, for example, having CPU 111 retrieve a map of known locations of ground control towers 140, cellular towers 150, and other terrestrial-based transceivers from memory 118 or from another database. Locating the communication channels can also include scanning for available communication channels using RF transceiver 115 and/or cellular transceiver 116, or another available source.

Figure 3:
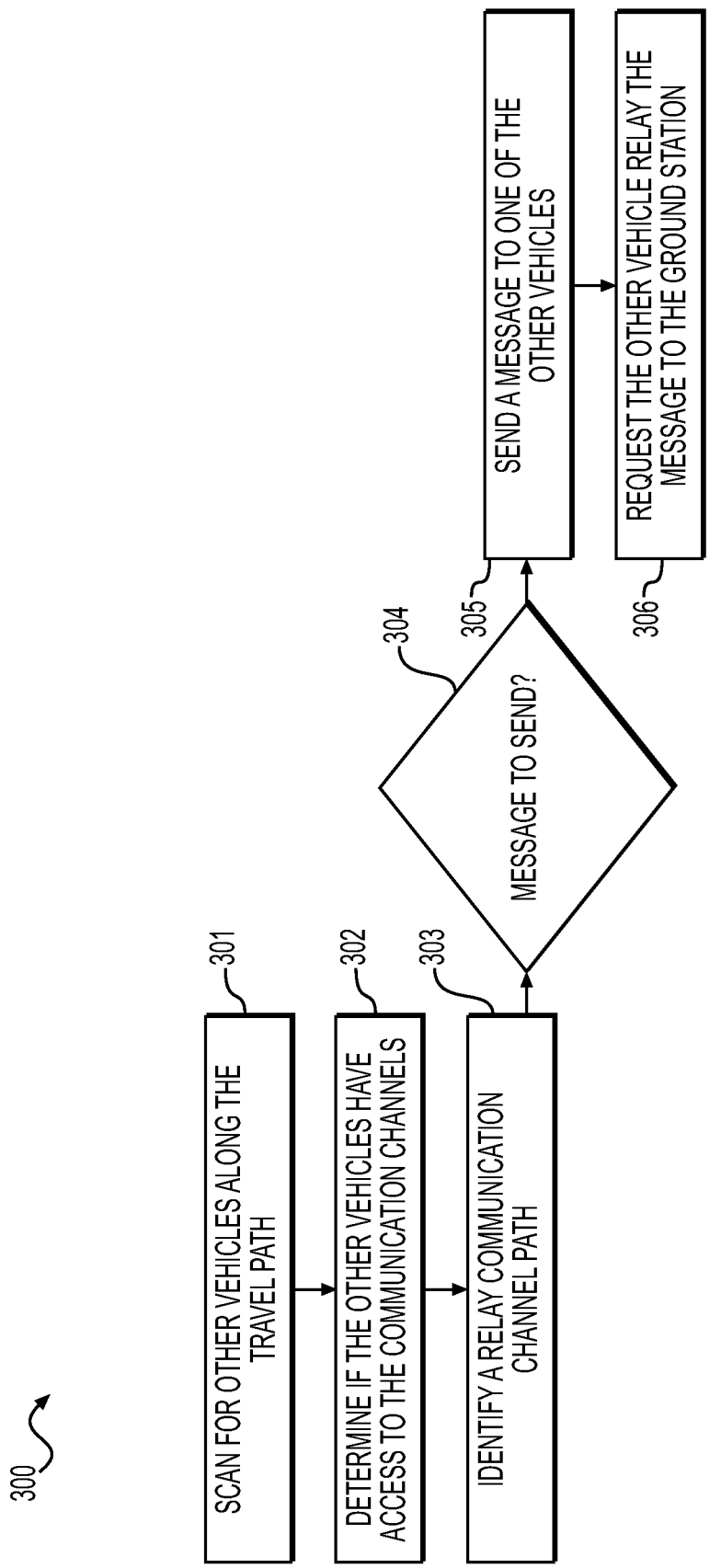
FIG. 3 depicts an exemplary flowchart for a process of identifying and using a relay communication channel path, according to one or more embodiments.

In some embodiments, as illustrated in FIG. 3, method 300 may be able to locate additional relay communication channels. Beginning at step 301, vehicle 110 may scan for other vehicles along the proposed travel path, for example, by using RF transceiver 115, either by directly contacting relay vehicles 120, or by receiving a listing of relay vehicles 120 in the area from ground control station 130. Cellular transceiver 116 may also be used to scan for relay vehicles via cellular tower 150 and its network connection 152 to either connect to a ground control station 130 or other database of relay vehicles 120 and their locations.

Having scanned and located relay vehicles 120, at step 302, a system in accordance with the present disclosure can determine to which communication channels relay vehicles 120 may have access. The system may rely on the locations and identifying information for relay vehicles 120 to determine what types of RF transceivers 125 and/or cellular transceivers 126 each relay vehicle 120 has onboard in order to determine to which communication channels a given relay vehicle 120 may have access. In some embodiments, vehicle 110 can receive information regarding which communication channels those relay vehicles 120 may have access to directly from the relay vehicles 120 by querying them directly or indirectly, for example, via ground control station 130.

Having the locations and communication channels accessible to relay vehicles 120, at step 303, vehicle 110 may identify one or more relay communication channel paths that may allow vehicle 110 to communicate with a ground control station 130 to which it may not have direct access. These relay communication paths may allow vehicle 110 to relay communications around one or more obstacles such as tall natural obstacles (e.g., hills, mountains) or erected structures on the ground (e.g., buildings).

In the event that vehicle 110 has a message to relay (304), the system may proceed to step 305, and send a message to be relayed to relay vehicle 120 via, for example RF transceivers 115 and 125. Then, at step 306, vehicle 110 can request that relay vehicle 120 forward the message on to ground control station 130 on behalf of vehicle 110. Provided the relay communication channel remains accessible, relay vehicle 120 may also relay one or more responsive messages from ground control station 130 back to vehicle 110.

Returning to FIG. 2, having located the communication channels likely to be accessible along at least a portion of the travel path, vehicle 110 can determine positions at which certain communication channels may not be accessible. This analysis may be carried out by CPU 111, and may result in, for example, a mapping of positions along the route where certain communication channels will be inaccessible due to range, or known line-of-sight obstacles. CPU 111 may use the known locations of communication towers 140, 150 and relay vehicles 120 in combination with characteristics of those towers and/or vehicles. For example, a ground control tower 140 may be of a certain type, height, and signal strength, and as such may have a radial line of sight communication range that differs from another tower. By analyzing the channels along the proposed path in combination with these other characteristics, positions of channel inaccessibility can be identified in advance of the vehicle navigating into those positions. In some embodiments, these positions may be displayed or otherwise conveyed to the vehicle operator via operator interface 117.

Subsequently or simultaneously, at step 204, vehicle 110 can calculate its present position and velocity using, for example, GPS receiver 114, flight sensors 112, and CPU 111. Reliable location data may be calculated in a number of ways, and this information can be combined with the positions of channel inaccessibility identified at step 203 in order to determine the communication channel availability (step 205). While the current communication channel availability may be determined by comparing the current vehicle position to the positions of channel inaccessibility, additional details regarding communication channel availability can be determined as well.

Figure 4:
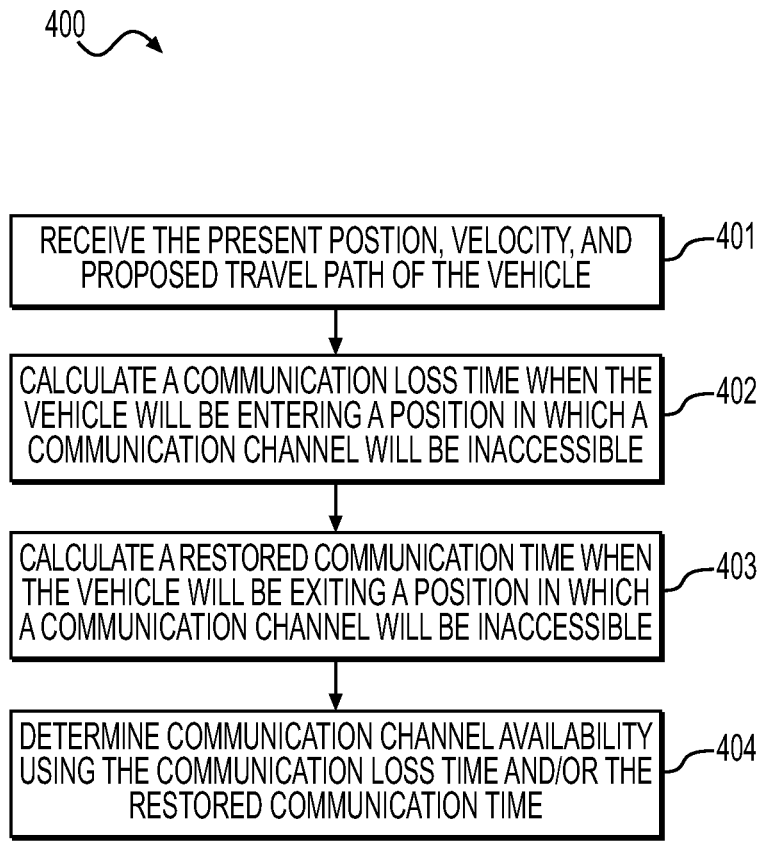
FIG. 4 depicts an exemplary flowchart for a process of determining communication channel availability, according to one or more embodiments.

In some embodiments, as illustrated in FIG. 4, method 400 may be able to determine additional details regarding communication channel availability, such as predictions of when a communication channel may become unavailable. At step 401, CPU 111 may receive the present position, velocity, and path of vehicle 110 as provided for at steps 201 and 204 of method 200. Having this information, CPU 111 may be able to predict the likely progress of vehicle 110 along the travel path. This predicted progress can allow CPU 111 to estimate a communication loss time corresponding to when the vehicle will cover a certain distance and enter one of the positions of channel inaccessibility (step 402). Similarly, CPU 111 can estimate a restored communication time corresponding to when the vehicle will be exiting one of the positions of channel inaccessibility and regain access to a particular communication channel (step 403). By calculating the communication channel availability as a function of travel time (step 404), the operator of the vehicle may have a more useful understanding of the communication availability, and may be able to plan ahead for any upcoming communication channel access issues.

Returning to FIG. 2, having determined the communication channel availability, at step 206 the vehicle can convey that availability to the vehicle operator. CPU 111 may cause a monitor or other display of the operator interface 117 to provide a visual representation of the calculated communication channel availability. The communication channel availability can be presented to the operator via a graphical user interface (GUI) that is stored in memory 118 and displayed on operator interface 117 by CPU 111.

Figure 5:
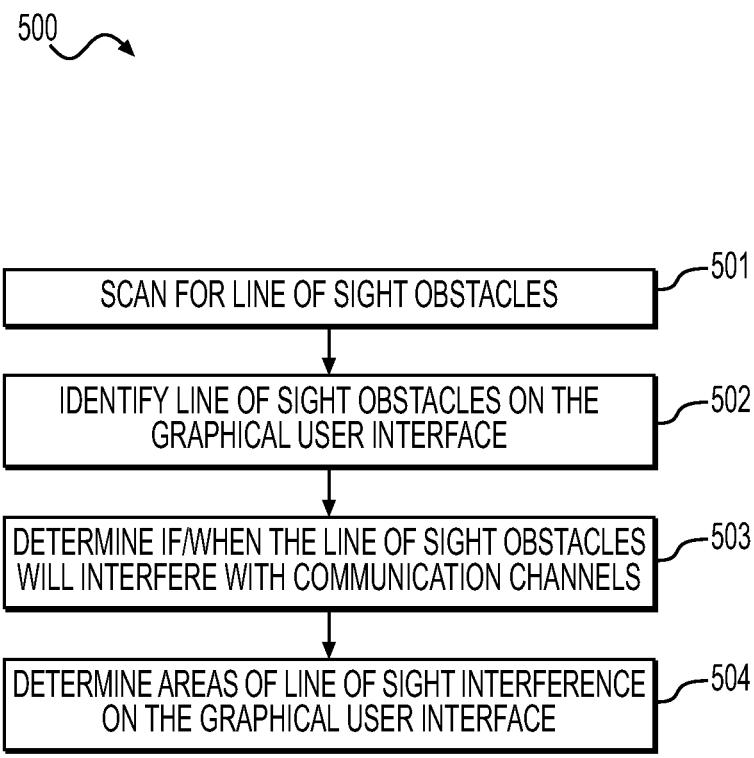
FIG. 5 depicts an exemplary flowchart for a process of displaying communication channel availability, according to one or more embodiments.

The calculated communication channel availability may be further effected by obstacles and other limitations being present in the airspace. In some situations, the vehicle operator may have the ability to slightly modify the vehicle path in response to these obstacles and limitations. In order to provide the operator with appropriate contextual communication channel availability, vehicle 110 may use method 500, illustrated in FIG. 5.

Method 500 can begin at step 501 with a scan for potential line of sight obstacles, such as buildings and mountains. This scan can be conducted by flight sensors 112, environment sensors 113, CPU 111, and any other sensor or device capable of providing vehicle 110 with information about potential obstacles in airspace 100. At step 502, CPU 111 may display the identified obstacles via the GUI of operator interface 117. By plotting the line of sight obstacles along the flight path, CPU 111 may further determine if there are any positions at which an obstacle could cause line of sight interference (step 503). At step 504, these positions at which an obstacle could cause interference can be identified on the GUI displayed on operator interface 117. This may provide the vehicle operator with additional context for the availability of communication channels. Method 500 may result in the vehicle operator's decision to request a modification to the flight plan, such as a request to fly higher or to deviate around an obstacle in order to avoid having communication obstructed partially or completely. In some embodiments in accordance with the present disclosure, CPU 111 may recalculate communication channel availability in response to the identification of a line of sight obstacle.

Figure 6:
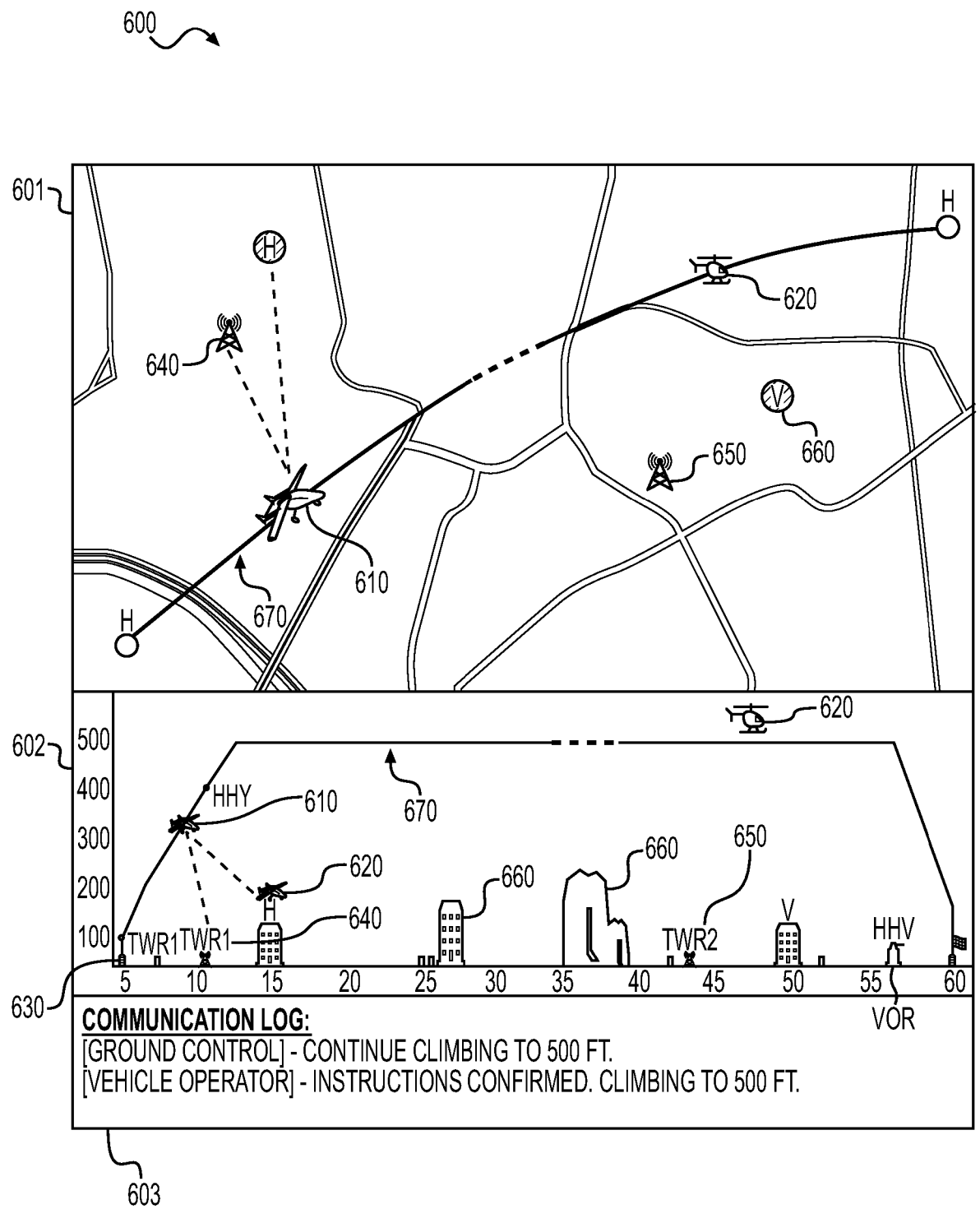
FIG. 6 depicts an exemplary graphical user interface, according to one or more embodiments.

The manner in which the GUI represents or presents the communication channel availability to the operator may be based on the position of the vehicle, the number of available communication channels, or other relevant factors. An exemplary GUI 600 in accordance with the present disclosure is shown in FIG. 6. GUI 600 may include a lateral profile 601 that shows the travel path on an overhead map, and a vertical profile 602 that shows the travel path as a function of altitude and linear progress along the proposed path. One or more display elements may represent, for example, the vehicle 610, relay vehicle 620, ground station 630, ground control tower 640, cellular tower 650, obstacles 660 in the airspace, proposed vehicle path 670, connections available 680 to vehicle 610, and those elements may be presented on one or both of lateral profile 601 and vertical profile 602.

In some embodiments in accordance with the present disclosure, GUI 600 may display additional flight communication information for the vehicle operator. For example, CPU 111 may process audio communications being received via RF transceiver 115 and/or cellular transceiver 116 to generate text of the incoming communication that may then be displayed to the operator in communication log 603 of GUI 600. Further, CPU 111 may process the audio communications being transmitted by vehicle 110, with the text of the outgoing communications being displayed to the operator in communication log 603.

Figure 7:
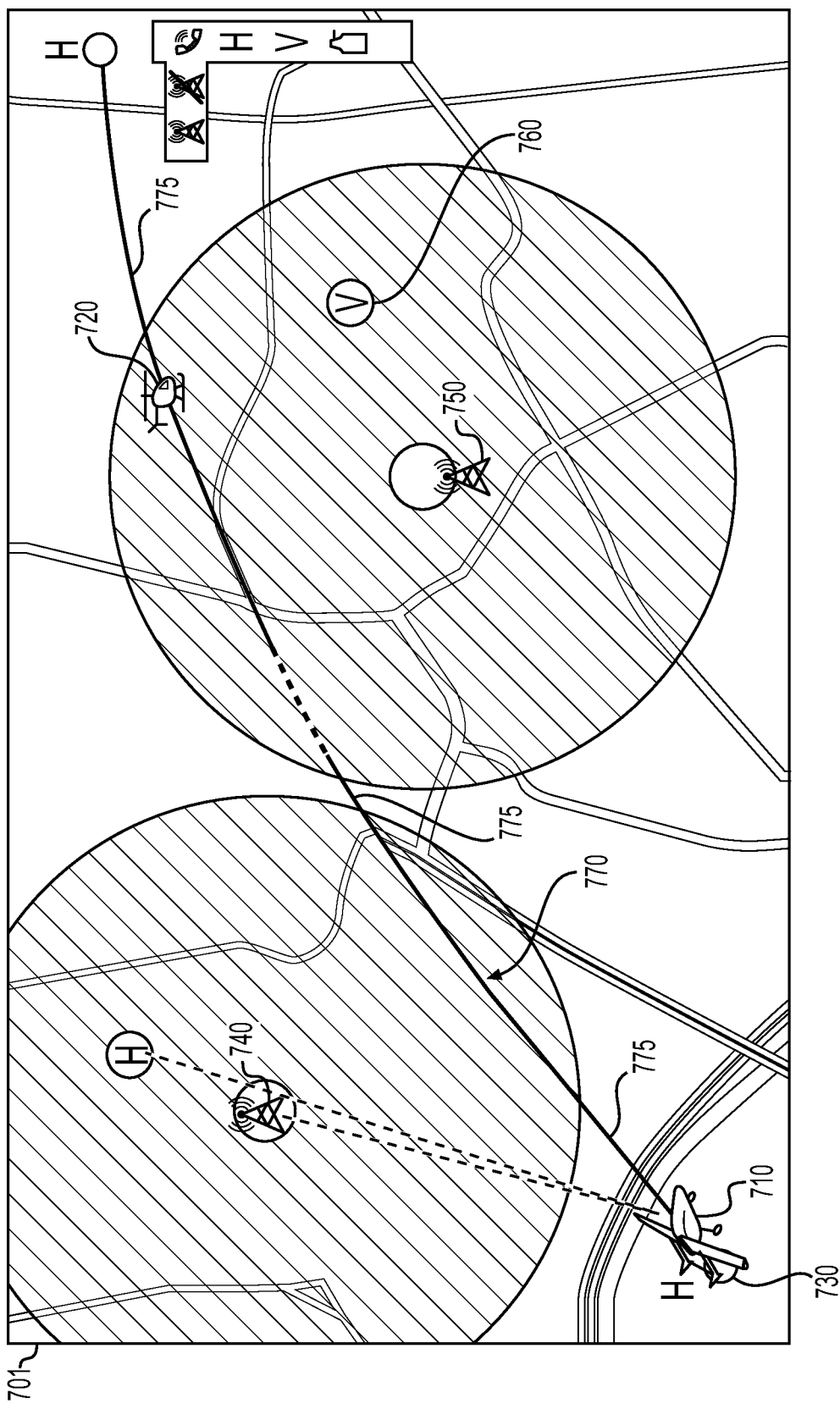
FIG. 7 depicts a lateral profile of exemplary graphical user interface, according to one or more embodiments.

FIG. 7 illustrates an exemplary lateral profile 701, showing calculated range of ground control tower 740 and cellular tower 750, in accordance with the present disclosure. CPU 111 may use the known positions of communication points (such as those of ground control tower 740 and cellular tower 750) in combination with other characteristics of those communication points including type of communication (e.g., RF, cellular, near-field), height of communication point (e.g., height and elevation of a transceiver), and signal strength of that communication channel to determine positions 775 at which certain communication channels may not be accessible along proposed travel path 770. As vehicle 710 navigates along travel path 770, lateral profile 701 may show the vehicle operator the positions of relay vehicle(s) 720, ground station(s) 730, and line of sight obstacle(s) 760, in addition to the calculated ranges of ground control tower(s) 740 and cellular tower(s) 750.

Figure 8:
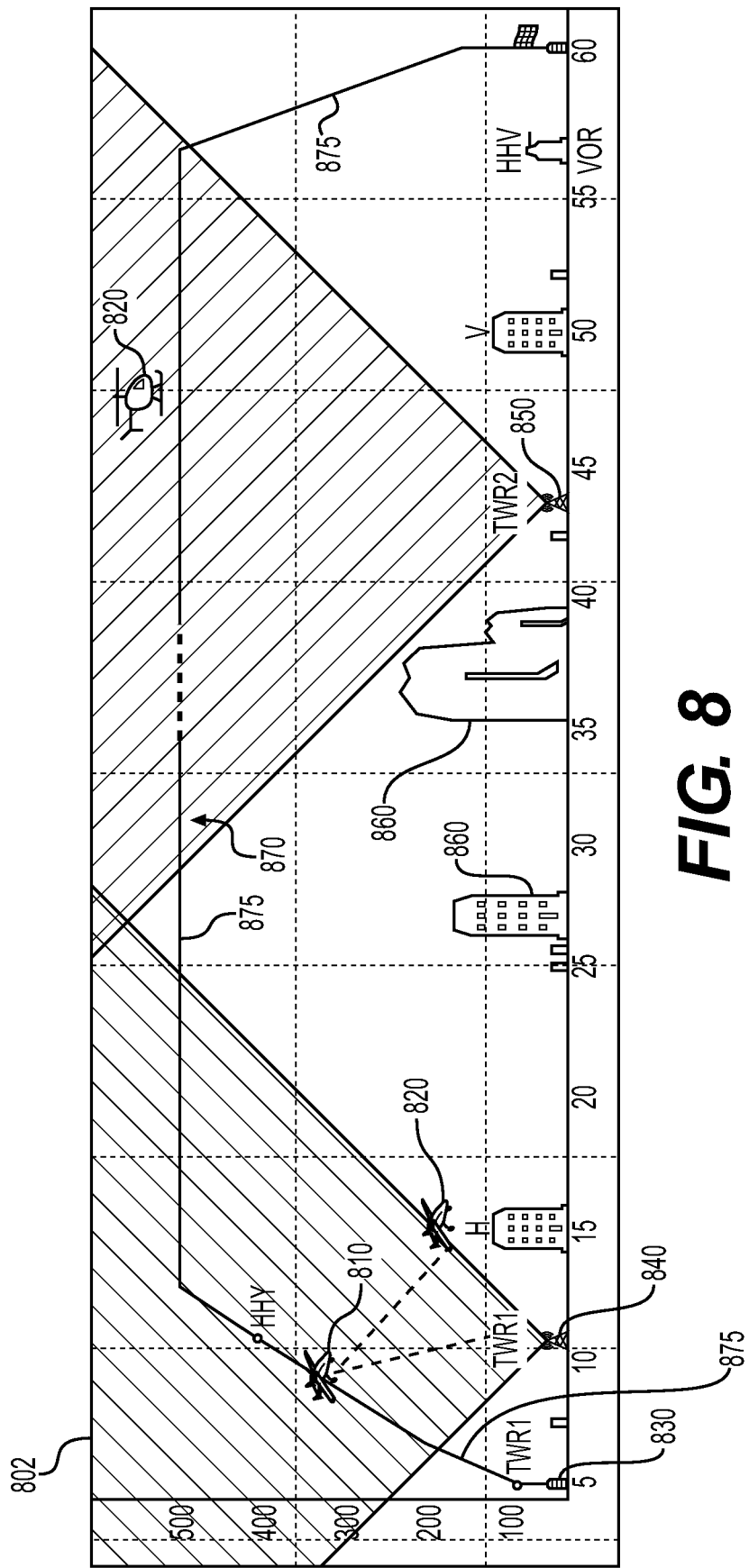
FIG. 8 depicts a vertical profile of an exemplary graphical user interface, according to one or more embodiments.

Similarly, FIG. 8 illustrates an exemplary vertical profile 802, showing the calculated range of ground control tower 840 and cellular tower 850, in accordance with the present disclosure. As in FIG. 7, CPU 111 may use the known positions of communication points (such as those of ground control tower 840 and cellular tower 850) in combination with other characteristics of those communication points to determine positions 875 at which certain communication channels may not be accessible along proposed travel path 870. As vehicle 810 navigates along travel path 870, vertical profile 802 may show the vehicle operator the positions of relay vehicle(s) 820, ground station(s) 830, and line of sight obstacle(s) 860, in addition to the calculated ranges of ground control tower(s) 840 and cellular tower(s) 850.

Figure 9:
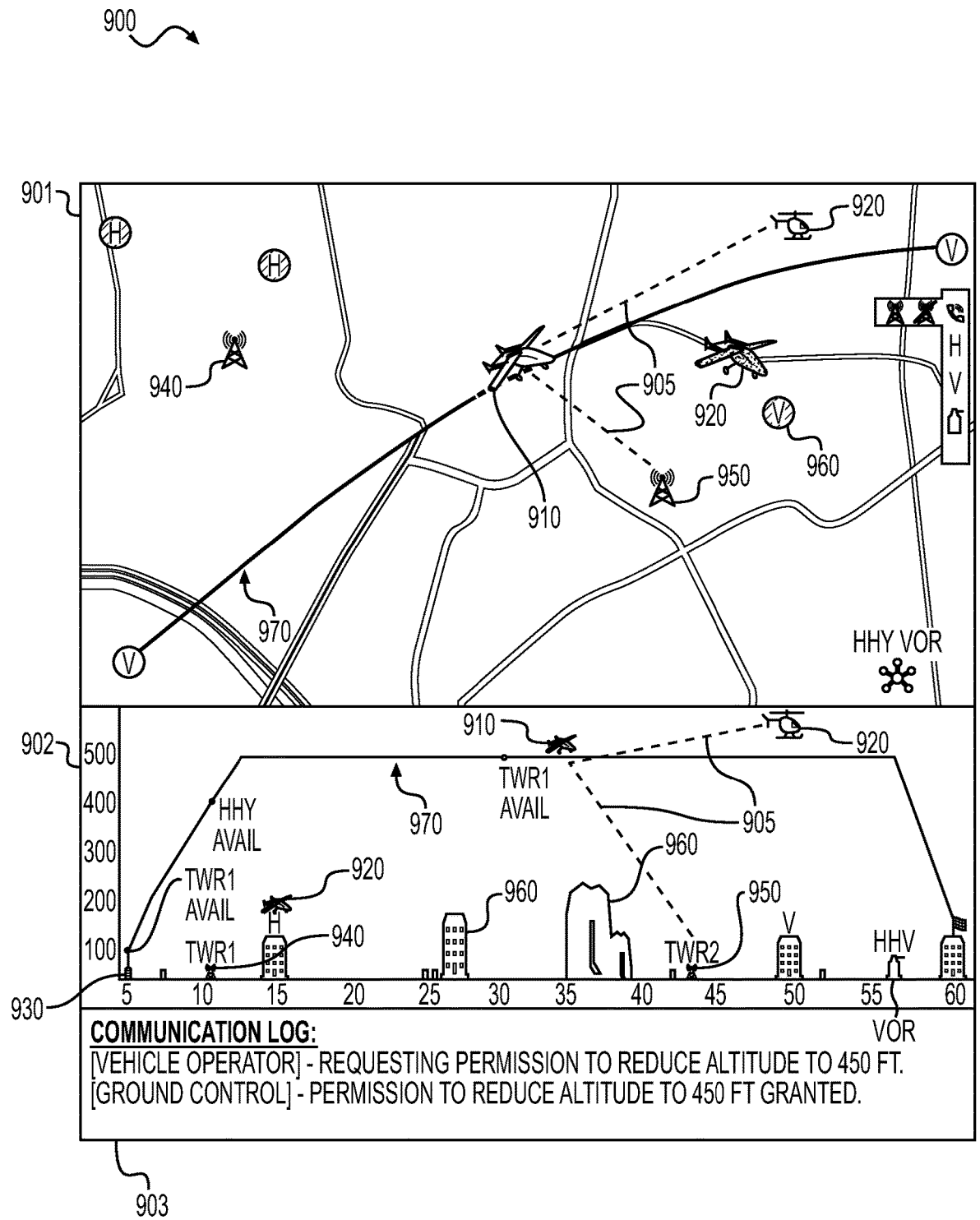
FIG. 9 depicts an exemplary graphical user interface, according to one or more embodiments.

During vehicle flight, the vehicle GUI may provide the operator with an easy to understand visualization of communication channel availability along a proposed flight path. In FIG. 9, an exemplary GUI 900 provides the operator with information regarding available communication channels 905 on both lateral profile 901 and vertical profile 902. As vehicle 910 navigates along travel path 970, lateral profile 901 and vertical profile 902 may show the vehicle operator the positions of relay vehicle(s) 920, ground station(s) 930, and line of sight obstacle(s) 960, in addition to the calculated ranges of ground control tower(s) 940 and cellular tower(s) 950. Communication log 903 may also provide information to the vehicle operator such as the text of incoming and/or outgoing communications such that the vehicle operator may be able to review the communication history to be able to determine if additional messages need to be sent, or if expected messages have not been received.

In some embodiments in accordance with the present disclosure, operator interface 117 may further include audio or tactile methods of communicating the communication channel availability to the vehicle operator, such as an alert tone, verbal alert, or vibration. Such additional communication methods may allow the vehicle operator to operate the vehicle without diverting as much visual attention from other aspects of vehicle flight such as viewing the airspace or flight instrumentation.

Systems and methods for generating visual cues for spatial communication coverage in accordance with the present disclosure may be able to provide a vehicle operator with information about available communication channels, both at a present time and in the future along a proposed flight path. This information may enable the vehicle operator to maintain focus elsewhere on other aspects of the vehicle's flight. This reduction of the time and attention needed to maintain communication channels may provide for a safer flight, with less trial-and-error style communication methods.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A system comprising:
   a memory storing instructions; and
   a processor executing the instructions to perform a process for generating visual cues for spatial communication coverage including:
   obtaining a proposed travel path for a vehicle;
   locating one or more communication channels accessible to an operator of the vehicle in an area that includes at least a portion of the proposed travel path, wherein the one or more communication channels provides contact to a ground station;
   analyzing one or more characteristics of the one or more communication channels to determine one or more positions within the area at which the one or more communication channels will be inaccessible to the operator;
calculating or receiving a present position and a velocity of the vehicle;
determining communication channel availability for the one or more communication channels;
scanning the area that includes at least a portion of the proposed travel path for one or more locations of one or more other vehicles;
determining, based on the one or more locations of the one or more other vehicles, whether one of the one or more other vehicles has access to the one or more communication channels;
identifying a relay communication channel path by sending a message to the ground station via relay through one of the one or more other vehicles over one of the one or more communication channels; and
presenting, via a graphical user interface, the communication channel availability on a display associated with the vehicle, based on the present position of the vehicle.

2. The system of claim 1, the process for generating visual cues for spatial communication coverage further comprising:
calculating a communication loss time corresponding to the vehicle entering the one or more positions; and
calculating a restored communication time corresponding to the vehicle exiting the one or more positions;
wherein determining communication channel availability for the one or more communication channels is based on at least one of: the communication loss time and the restored communication time.

3. The system of claim 2, wherein the communication loss time and the restored communication time are determined based on the present position, velocity, and proposed travel path of the vehicle.

4. The system of claim 3, wherein the graphical user interface includes:
a lateral profile that displays the proposed travel path and the one or more positions on an overhead map; and
a vertical profile that plots the proposed travel path as a function of altitude and linear progress along the proposed travel path.

5. The system of claim 1, the process for generating visual cues for spatial communication coverage further comprising:
processing incoming audio communications to generate incoming communication text; and
displaying the incoming communication text to the operator via the graphical user interface.

6. The system of claim 5, the process for generating visual cues for spatial communication coverage further comprising:
processing outgoing audio communications to generate outgoing communication text; and
displaying the outgoing communication text to the operator via the graphical user interface.

7. The system of claim 1, wherein the process of analyzing the one or more characteristics of the one or more communication channels includes:
determining a communication channel type for each of the one or more communication channels; and
calculating a radial line of sight communication distance for each of the one or more communication channels.

8. The system of claim 1, wherein the process of determining communication channel availability for the one or more communication channels includes:
scanning the area that includes at least a portion of the proposed travel path for one or more line of sight obstacles; and
determining whether or not, for a given vehicle position and altitude, the one or more line of sight obstacles will render one or more communication channels inaccessible to the operator.

9. The system of claim 8, wherein the process of presenting the communication channel availability to the operator includes identifying the one or more line of sight obstacles on the graphical user interface.

10. A method for generating visual cues for spatial communication coverage, the method comprising:
obtaining a proposed travel path for a vehicle;
locating one or more communication channels accessible to an operator of the vehicle in an area that includes at least a portion of the proposed travel path, wherein the one or more communication channels provides contact to a ground station;
analyzing one or more characteristics of the one or more communication channels to determine one or more positions within the area at which the one or more communication channels will be inaccessible to the operator;
calculating a present position and a velocity of the vehicle;
scanning the area that includes at least a portion of the proposed travel path for one or more line of sight obstacles;
determining whether or not, for a given vehicle position and altitude, the one or more line of sight obstacles will render one or more communication channels inaccessible to the operator;
determining communication channel availability for the one or more communication channels; and
presenting, via a graphical user interface, the communication channel availability to the operator, based on the present position of the vehicle.

11. The method of claim 10, further comprising:
scanning the area that includes at least a portion of the proposed travel path for one or more locations of one or more other vehicles;
determining, based on the one or more locations of the one or more other vehicles, whether or not one of the one or more other vehicles has access to the one or more communication channels; and
identifying a relay communication channel path; wherein the relay communication channel path includes:
sending a message to one of the one or more other vehicles;
wherein the one of the one or more other vehicles relays the message to the ground station via one of the one or more communication channels.

12. The method of claim 10, further comprising:
calculating a communication loss time corresponding to the vehicle entering the one or more positions; and
calculating a restored communication time corresponding to the vehicle exiting the one or more positions;
wherein determining communication channel availability for the one or more communication channels is based on at least one of: the communication loss time and the restored communication time.

13. The method of claim 12, wherein the communication loss time and the restored communication time are determined based on the present position, velocity, and proposed travel path of the vehicle.

14. The method of claim 13, wherein the graphical user interface includes:
   a lateral profile that displays the proposed travel path and the one or more positions on an overhead map; and
   a vertical profile that plots the proposed travel path as a function of altitude and linear progress along the proposed travel path.

15. The method of claim 10, further comprising:
   processing incoming audio communications to generate incoming communication text; and
   displaying the incoming communication text to the operator via the graphical user interface.

16. The method of claim 10, wherein analyzing the one or more characteristics of the one or more communication channels includes:
   determining a communication channel type for each of the one or more communication channels; and
   calculating a radial line of sight communication distance for each of the one or more communication channels.

17. The method of claim 10, wherein presenting the communication channel availability to the operator includes identifying the one or more line of sight obstacles on the graphical user interface.

\* \* \* \* \*